US 12,141,421 B2

(12) United States Patent
Seo et al.

(10) Patent No.: US 12,141,421 B2
(45) Date of Patent: Nov. 12, 2024

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Chanwon Seo, Suwon-si (KR); Youngeun Lee, Suwon-si (KR); Eunseo Kim, Suwon-si (KR); Myungjin Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 732 days.

(21) Appl. No.: 17/156,086

(22) Filed: Jan. 22, 2021

(65) Prior Publication Data

US 2021/0232863 A1 Jul. 29, 2021

Related U.S. Application Data

(60) Provisional application No. 62/964,804, filed on Jan. 23, 2020.

(30) Foreign Application Priority Data

May 6, 2020 (KR) .................. 10-2020-0053722

(51) Int. Cl.
*G06F 3/04845* (2022.01)
*G06F 18/214* (2023.01)
(Continued)

(52) U.S. Cl.
CPC ........ *G06F 3/04845* (2013.01); *G06F 18/214* (2023.01); *G06F 18/22* (2023.01);
(Continued)

(58) Field of Classification Search
CPC .... G06F 3/04845; G06F 18/214; G06F 18/22; G06F 3/0488; G06N 3/08; G06N 3/045;
(Continued)

(56) References Cited

U.S. PATENT DOCUMENTS

| 7,956,906 B2 | 6/2011 | Nojima |
| 8,514,315 B2 | 8/2013 | Lee et al. |

(Continued)

FOREIGN PATENT DOCUMENTS

| EP | 3531370 A2 | 8/2019 |
| JP | 2002543695 A | 12/2002 |

(Continued)

OTHER PUBLICATIONS

International Search Report and Written Opinion dated May 17, 2021, issued by the International Searching Authority in counterpart International Application No. PCT/KR2021/000831 (PCT/ISA/210 and 237).

(Continued)

*Primary Examiner* — Michael S Osinski
(74) *Attorney, Agent, or Firm* — Sughrue Mion, PLLC

(57) ABSTRACT

An electronic device and a controlling method thereof are provided. An electronic device includes a memory configured to store at least one instruction and a processor configured to execute the at least one instruction and operate as instructed by the at least one instruction. The processor is configured to: obtain a first image; based on receiving a first user command to correct the first image, obtain a second image by correcting the first image; based on the first image and the second image, train a neural network model; and based on receiving a second user command to correct a third image, obtain a fourth image by correcting the third image using the trained neural network model.

20 Claims, 17 Drawing Sheets

(51) Int. Cl.
| | |
|---|---|
| *G06F 18/22* | (2023.01) |
| *G06N 3/08* | (2023.01) |
| *G06T 5/00* | (2024.01) |
| *G06V 10/82* | (2022.01) |
| *G06V 20/00* | (2022.01) |
| *G06V 40/16* | (2022.01) |

(52) U.S. Cl.
CPC .............. *G06N 3/08* (2013.01); *G06T 5/00* (2013.01); *G06V 10/82* (2022.01); *G06V 20/35* (2022.01); *G06T 2200/24* (2013.01); *G06T 2207/20081* (2013.01); *G06T 2207/20084* (2013.01); *G06V 40/161* (2022.01)

(58) Field of Classification Search
CPC .......... G06N 3/047; G06N 3/084; G06T 5/00; G06T 2200/24; G06T 2207/20081; G06T 2207/20084; G06T 5/60; G06V 10/82; G06V 20/35; G06V 40/161; H04N 23/617; H04N 23/631; H04N 23/64

See application file for complete search history.

(56) References Cited

U.S. PATENT DOCUMENTS

| | | | |
|---|---|---|---|
| 9,571,754 | B2 | 2/2017 | Park et al. |
| 9,996,772 | B2* | 6/2018 | Ahmed ................ G06F 18/24 |
| 10,380,724 | B1* | 8/2019 | Kim ..................... G06F 18/22 |
| 10,497,105 | B2 | 12/2019 | Cardei |
| 10,635,938 | B1* | 4/2020 | Kim ................... G06V 10/774 |
| 10,755,447 | B2* | 8/2020 | Chhaya ............... G06V 10/82 |
| 10,803,355 | B2* | 10/2020 | Lin ..................... G06N 20/00 |
| 10,855,933 | B2 | 12/2020 | Ahn et al. |
| 11,222,413 | B2* | 1/2022 | Kim ..................... G06T 5/20 |
| 11,699,213 | B2* | 7/2023 | Ban ..................... G06T 5/001 382/156 |
| 11,763,440 | B2 | 9/2023 | Baek ................... G06N 20/20 382/100 |
| 2008/0079822 | A1 | 4/2008 | Nojima |
| 2010/0208093 | A1 | 8/2010 | Lee et al. |
| 2016/0127653 | A1* | 5/2016 | Lee .................... H04N 23/64 348/239 |
| 2017/0316285 | A1* | 11/2017 | Ahmed ................. G06T 7/11 |
| 2018/0144519 | A1 | 5/2018 | Didow et al. |
| 2018/0227560 | A1* | 8/2018 | Fredlund ................ H04N 9/68 |
| 2018/0241929 | A1* | 8/2018 | Bouzaraa ........... H04N 23/6845 |
| 2018/0253866 | A1* | 9/2018 | Jain .................... G06F 18/2431 |
| 2018/0314716 | A1* | 11/2018 | Kim ..................... G06T 1/20 |
| 2019/0139191 | A1* | 5/2019 | Liu .................... G06N 3/045 |
| 2019/0238759 | A1 | 8/2019 | Ahn et al. |
| 2019/0259134 | A1* | 8/2019 | Rainy ................... G06N 3/045 |
| 2019/0279345 | A1* | 9/2019 | Kim ..................... G06T 5/20 |
| 2019/0295223 | A1* | 9/2019 | Shen ................... G06N 3/045 |
| 2019/0325567 | A1* | 10/2019 | Jones ................... G06T 5/60 |
| 2019/0325616 | A1 | 10/2019 | Chhaya et al. |
| 2019/0333198 | A1* | 10/2019 | Wang ................... G06T 5/50 |
| 2020/0005100 | A1 | 1/2020 | Kim |
| 2020/0013371 | A1 | 1/2020 | Yang et al. |
| 2020/0015575 | A1 | 1/2020 | Fu et al. |
| 2020/0065619 | A1* | 2/2020 | Liu .................... G06N 3/045 |
| 2020/0092465 | A1 | 3/2020 | Lee et al. |
| 2020/0202174 | A1* | 6/2020 | Lin .................... G06V 10/774 |
| 2020/0202502 | A1* | 6/2020 | Tsymbalenko ........... G06T 5/50 |
| 2020/0285959 | A1* | 9/2020 | Liu ..................... G06T 3/4053 |
| 2021/0027457 | A1* | 1/2021 | Nakajima ............... G06F 30/27 |
| 2021/0089777 | A1* | 3/2021 | Shrivastava .......... G06T 11/001 |
| 2021/0089903 | A1* | 3/2021 | Murray ............... G06F 18/2132 |
| 2021/0133931 | A1* | 5/2021 | Lee ..................... G06T 5/002 |
| 2021/0133932 | A1* | 5/2021 | Lee ...................... G06T 7/90 |
| 2021/0158570 | A1* | 5/2021 | Mohandoss .......... H04N 1/6052 |
| 2021/0160415 | A1* | 5/2021 | Han ..................... H04N 23/80 |
| 2021/0192801 | A1* | 6/2021 | Zeller ................... G06T 11/00 |
| 2021/0201071 | A1* | 7/2021 | Liao .................... G06T 11/001 |
| 2021/0201075 | A1* | 7/2021 | Pahde ................... G06T 17/20 |
| 2021/0216816 | A1* | 7/2021 | Huang ................. G06V 10/56 |
| 2021/0233214 | A1* | 7/2021 | Liu ..................... G06T 5/003 |
| 2021/0241041 | A1* | 8/2021 | Mounsaveng ........... G06T 3/02 |
| 2021/0287047 | A1* | 9/2021 | Gao .................... G06F 18/2148 |
| 2021/0287799 | A1* | 9/2021 | Guendel ................. G06T 5/77 |
| 2021/0368211 | A1* | 11/2021 | Wan .................... H04N 19/117 |
| 2022/0051373 | A1* | 2/2022 | Kappel ................. G06T 5/20 |
| 2022/0067441 | A1* | 3/2022 | Zhang ............... G06F 18/21347 |
| 2022/0092355 | A1* | 3/2022 | Su ..................... G06F 18/214 |
| 2022/0180490 | A1* | 6/2022 | Jo ..................... G06T 11/60 |
| 2022/0198790 | A1* | 6/2022 | Li ..................... G06V 10/28 |
| 2022/0237830 | A1* | 7/2022 | Khodadadeh .......... G06N 3/045 |
| 2022/0301114 | A1* | 9/2022 | Marras ................. G06T 5/70 |
| 2022/0343475 | A1* | 10/2022 | Zhang ................. G06T 5/50 |
| 2022/0409145 | A1* | 12/2022 | Knobloch ........... G01R 33/5608 |
| 2023/0042221 | A1* | 2/2023 | Xu ..................... G06N 3/084 |
| 2023/0342894 | A1* | 10/2023 | Scharfenberger ...... H04N 23/70 |
| 2023/0401682 | A1* | 12/2023 | Hu ...................... G06V 10/774 |
| 2024/0062530 | A1* | 2/2024 | Panetta ............... G06V 10/7715 |

FOREIGN PATENT DOCUMENTS

| | | |
|---|---|---|
| JP | 3991196 B2 | 10/2007 |
| JP | 2012165462 A | 8/2012 |
| JP | 5076695 B2 | 11/2012 |
| KR | 10-1559583 B1 | 10/2015 |
| KR | 1020160131273 A | 11/2016 |
| KR | 1020180051367 A | 5/2018 |
| KR | 10-2019-0092995 A | 8/2019 |
| KR | 10-2019-0100097 A | 8/2019 |
| KR | 10-2019-0104927 A | 9/2019 |
| KR | 1020190105533 A | 9/2019 |
| WO | 0065847 A1 | 11/2000 |

OTHER PUBLICATIONS

W. Sun et al., "Photo Filter Recommendation by Category—Aware Aesthetic Learning", IEEE Transactions On Multimedia, vol. 19, No. 8, Aug. 2017, XP011657022, (11 total pages).

T. Portenier et al., "FaceShop: Deep Sketch-based Face Image Editing", ACM Transactions on Graphics, vol. 37, No. 4, Article 99, Aug. 2018, XP058634475, (13 total pages).

Y. Choi et al., "StarGAN: Unified Generative Adversarial Networks for Multi-Domain Image-to-Image Translation", 2018 IEEE/CVF Conference on Computer Vision and Pattern Recognition, Jun. 2018, XP033473803, (9 total pages).

Communication dated Dec. 8, 2022 issued by the European Patent Office in European Patent Application No. 21743959.5.

Communication dated Nov. 10, 2022 issued by Intellectual Property India in counterpart Indian Patent Application No. 202247041679.

Communication issued May 22, 2024 by the Intellectual Property Office of India in Indian Patent Application No. 202247041679.

Communication issued Mar. 8, 2024 by the Korean Intellectual Property Office in Korean Patent Application No. 10-2020-0053722.

Examination Report issued on Sep. 20, 2024 issued by the European Patent Office for European Patent Application No. 21743959.5.

* cited by examiner

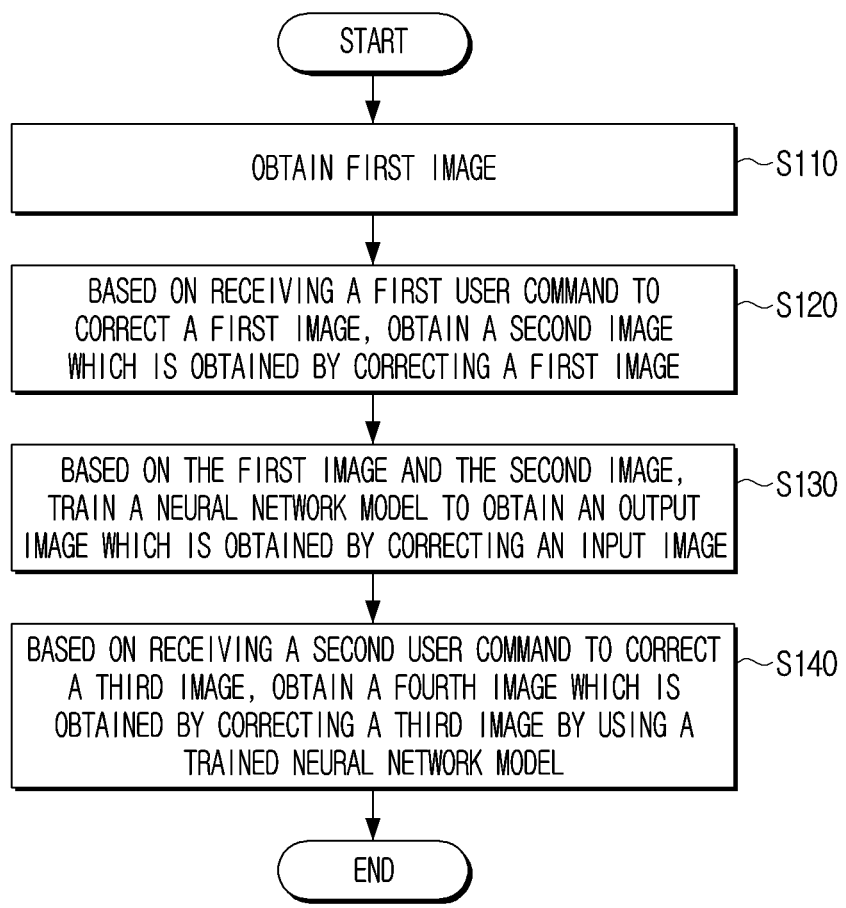

ELECTRONIC DEVICE AND CONTROLLING METHOD OF ELECTRONIC DEVICE

CROSS-REFERENCE TO RELATED APPLICATION(S)

This application is based on and claims priority under 35 U.S.C. § 119 to Korean Patent Application No. 10-2020-0053722, filed on May 6, 2020, in the Korean Intellectual Property Office, and U.S. Provisional Application No. 62/964,804, filed on Jan. 23, 2020, in the United States Patent and Trademark Office, the disclosures of which are incorporated by reference herein in their entireties.

BACKGROUND

1. Field

The disclosure relates to an electronic device and a controlling method of the electronic device and, more particularly, to an electronic device capable of correcting an image and a controlling method thereof.

2. Description of Related Art

With the development of portable electronic devices and social media, it has become a daily routine to obtain an image by using various kinds of portable electronic devices including a smart phone, and correct the obtained image to be suitable for a user's own taste.

In order to solve problems in which a user of a portable electronic device is required to put a lot of effort into correcting a lot of images, many applications are being developed so that even if a user does not set a correction parameter related to correct an image, a function capable of automatically correcting an image is provided through an application for image correction.

However, the correction patterns preferred by each user may be different and thus, there is a limitation that it is difficult to satisfy all users having diverse aesthetic appetite and tastes with only a function of automatically correcting an image by applying a generalized correction pattern.

Accordingly, there is a need for automatically correcting an original image to improve the convenience of a user, and at the same time, automatically reflect a correction pattern preferred by a user in correcting the image, thereby providing an image satisfying each individual user in a preferred pattern.

SUMMARY

Provided are an electronic device capable of obtaining a corrected image by reflecting a correction pattern preferred by a user into an original image and a controlling method thereof.

Additional aspects will be set forth in part in the description which follows, and in part, will be apparent from the description, or may be learned by practice of the presented embodiments In accordance with an aspect to the disclosure, there is provided an electronic device including: a memory configured to store at least one instruction: and a processor configured to execute the at least one instruction and operate as instructed by the at least one instruction. The processor is configured to: obtain a first image: based on receiving a first user command to correct the first image, obtain a second image by correcting the first image: based on the first image and the second image, train a neural network model: and based on receiving a second user command to correct a third image, obtain a fourth image by correcting the third image using the trained neural network model.

The processor is further configured to: obtain first type information including a type of the first image: and train the neural network model based on the first image, the second image, and the first type information.

The processor is further configured to: based on obtaining the third image, obtain second type information including a type of the third image; and based on receiving the second user command to correct the third image, obtain the fourth image by correcting the third image using the trained neural network model based on the third image and the second type information.

The first type information includes at least one of information about an object included in the first image and the second image, information of a place where the first image and the second image are obtained, and a time at which the first image and the second image are obtained.

The neural network model includes a first neural network model including a generator configured to generate an image and a comparator configured to compare a plurality of images, and wherein the processor is further configured to: obtain a fifth image which is obtained by correcting the first image by inputting the first image to the generator; obtain first feedback information based on a difference between a pixel value of the second image and a pixel value of the fifth image by inputting the second image and the fifth image to the comparator; and train the generator based on the first feedback information.

The processor is further configured to, based on receiving the second user command, obtain the fourth image by correcting the third image by inputting the third image to the first neural network model.

The first neural network model is a generative adversarial network (GAN) model, and the generator and the comparator are trained in an adversarial manner from each other.

The neural network model includes a second neural network model including an implementor configured to obtain information on at least one correction parameter associated with correction of an image and a comparator configured to compare a plurality of images, and the processor is further configured to: obtain information on at least one correction parameter associated with correction of the first image by inputting the first image to the implementor: obtain a sixth image by correcting the first image based on the information about the at least one correction parameter: obtain second feedback information based on a difference between a pixel value of the second image and a pixel value of the sixth image by inputting the second image and the sixth image to the comparator: and train the implementor based on the second feedback information.

The processor is further configured to: based on receiving the second user command, input the third image to the second neural network model: and obtain the fourth image by correcting the third image based on the information on the at least one correction parameter associated with correction of the first image.

The electronic device further includes: a display, and the processor is further configured to: based on obtaining the fourth image, control the display to display a first user interface (UI) element to select whether to correct the fourth image based on a user setting with respect to a correction parameter; based on receiving a third user command for selecting to correct the fourth image through the first UI element, control the display to display a second UI element to select at least one parameter associated with correction of the fourth image: and based on receiving a fourth user command for selecting the at least one parameter associated with the correction of the fourth image through the second UI element, obtain a seventh image by correcting the fourth image.

The processor is further configured to, based on obtaining the seventh image by correcting the fourth image, train the neural network model based on the third image and the seventh image.

The processor is further configured to: based on obtaining the third image, identify at least one object included in the third image, and based on a preset object being included in the identified at least one object, determine the identified at least one object as a target of correction and obtain an eighth image by correcting the target of the correction among the at least one object included in the third image, by inputting the third image to the trained neural network model.

The first image and the second image are compared based on first metadata and second metadata corresponding to each of the first image and the second image, respectively, and input the first metadata to the generator and the second metadata to the comparator, wherein the first metadata includes information on at least one of a first generation time, a first generation device, and a first correction time of the first image, and wherein the second metadata includes information on at least one of a second generation time, a second generation device, and a second correction time of the second image.

In accordance with an aspect of the disclosure, there is provided a method for controlling of an electronic device, the method including: obtaining a first image; based on receiving a first user command to correct the first image, obtaining a second image by correcting the first image: based on the first image and the second image, training a neural network model; and based on receiving a second user command to correct a third image, obtaining a fourth image by correcting the third image using the trained neural network model.

The training the neural network model includes: obtaining first type information including a type of the first image: and training the neural network model based on the first image, the second image, and the first type information.

The training the neural network model further includes: based on obtaining the third image, obtaining second type information associated with a type of the third image; and based on receiving the second user command to correct the third image, obtaining the fourth image by correcting the third image using the trained neural network model based on the third image and the second type information.

The first type information includes at least one of information about an object included in the first image and the second image, information of a place where the first image and the second image are obtained, and a time at which the first image and the second image are obtained.

The method further includes: based on obtaining the fourth image, displaying a first user interface (UI) element to select whether to correct the fourth image based on a user setting with respect to a correction parameter: based on receiving a third user command for selecting to correct the fourth image through the first UI element, displaying a second UI element to select at least one parameter associated with correction of the fourth image: and based on receiving a fourth user command for selecting the at least one parameter associated with the correction of the fourth image through the second UI element, obtaining a seventh image by correcting the fourth image.

The training the neural network model further includes: based on obtaining the seventh image by correcting the fourth image, training the neural network model based on the third image and the seventh image.

In accordance with an aspect of the disclosure, there is provided a non-transitory computer readable recording medium including a program executing a controlling method of an electronic device, the method including: obtaining a first image; based on receiving a first user command to correct the first image, obtaining a second image by correcting the first image: based on the first image and the second image, training a neural network model: and based on receiving a second user command to correct a third image, obtaining a fourth image by correcting the third image using the trained neural network model.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a flowchart illustrating a controlling method of an electronic device according to an embodiment:

DETAILED DESCRIPTION

Figure 2A:
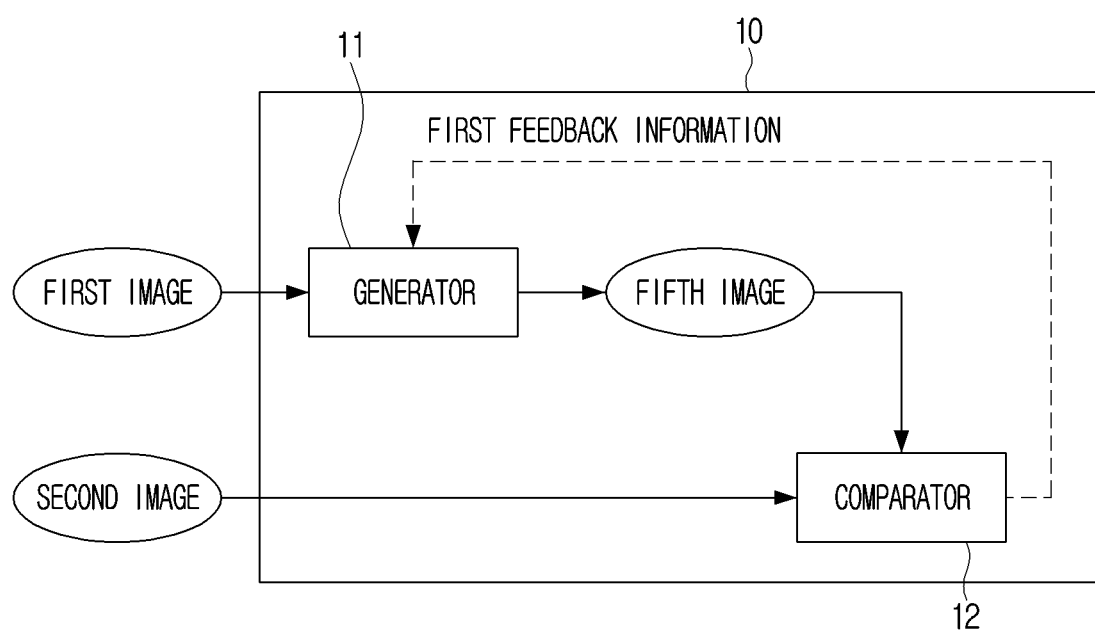
FIG. 2A is a diagram illustrating a process of training of a first neural network model and obtaining a corrected image using a trained first neural network model, according an embodiment.

Hereinafter, embodiments of the disclosure will be described with reference to the accompanying drawings. However, it may be understood that the disclosure is not limited to the embodiments described hereinafter, but also includes various modifications, equivalents, and/or alternatives of these embodiments. In relation to explanation of the drawings, similar drawing reference numerals may be used for similar constituent elements.

In the following description, a detailed description of the related art may be omitted when it is determined that such description may obscure the gist of the disclosure.

In addition, the following embodiments may be combined and modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified.

In the disclosure, expressions such as "have," "may have," "include," "may include" or the like represent presence of a corresponding feature (for example, components such as numbers, functions, operations, or parts) and do not exclude the presence of additional features.

In the disclosure, expressions such as "at least one of A [and/or] B," or "one or more of A [and/or] B," include all possible combinations of the listed items. For example, "at least one of A and B," or "at least one of A or B" includes any of (1) only A, (2) only B, or (3) both A and B.

As used herein, the terms "first," "second," or the like may denote various components, regardless of order and/or importance, and may be used to distinguish one component from another, and does not otherwise limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily mean that a device is "specifically designed to" in terms of hardware.

Under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

In an embodiment, "module" or "part" performs at least one function or operation, and may be implemented in hardware or software or in a combination of hardware and software. In addition, a plurality of "modules" or a plurality of "parts" may be integrated into at least one module except for a "module" or "part" that needs to be implemented in a specific hardware, and may be implemented as at least one processor.

It is to be understood that various elements and regions in the figures may be out of scale. The scope of the disclosure is not limited by the relative sizes or spacing illustrated in the accompanying drawings.

An electronic device according to various embodiments may include at least one of, for example, a smartphone, a tablet personal computer (PC), a desktop PC, a laptop PC, or a wearable device. A wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g., electronic cloth): skin-attached type (e.g., a skin pad or a tattoo); or a bio-implantable circuit.

In some embodiments, the electronic device may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

In other embodiments, the electronic device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale of a store, or an Internet of Things (IoT) device (e.g., light bulbs, sensors, sprinkler devices, fire alarms, thermostats, street lights, toasters, exercise equipment, hot water tanks, heater, boiler, etc.).

Hereinafter, with reference to the accompanying drawings, embodiments will be described in detail so that those skilled in the art to which the disclosure belongs to can easily make and use the embodiments.

FIG. 1 is a flowchart illustrating a controlling method of an electronic device according to an embodiment.

The electronic device may be a portable electronic device, such as a smart phone, tablet, or the like, and there is no limitation to a type of the electronic device. Hereinafter, an electronic device according to an embodiment of the disclosure will be described as an electronic device 100.

Referring to FIG. 1, the electronic device 100 according to an embodiment may obtain a first image in operation S110. Specifically, the electronic device 100 may obtain a first image through a camera included in the electronic device 100. The electronic device 100 may also obtain a first image from an external device connected to the electronic device 100. The electronic device 100 (shown in FIGS. 9 and 10) may store the obtained first image in a memory 110 of the electronic device 100.

If a first user command for correcting the first image is received, the electronic device 100 may obtain a second image which is obtained by correcting the first image in operation S120. Specifically, when a first user command for correcting the first image is received after the first image is obtained, the electronic device 100 may change at least one correction parameter related to the correction of the first image based on the setting of the user and obtain a second image by correcting the first image. The electronic device 100 may store the obtained second image in a memory of the electronic device 100.

In the disclosure, the term "correction parameter" may refer to various types of parameters related to the correction of an image, e.g., hue, brightness, saturation, contrast, exposure, highlight, shadow, lightness, color temperature, noise, vignette, and black points, but the correction parameters are not limited to the examples described above.

The "first user command" may refer to a user command for obtaining a corrected image based on the user's setting for the correction parameter. Specifically, the first user command may set how a user of the electronic device 100 is to change at least one correction parameter related to correction of the first image, and apply the set correction parameter to the first image to generate a second image. For example, if a user of the electronic device 100 inputs a first user command to change the brightness and saturation of the first image to +13 and +8, respectively, through an application for image correction, the electronic device 100 may obtain a second image which is obtained from the first image of which brightness and saturation are changed to +13 and +8, respectively. When providing a user interface (UI) such as a control bar without providing a numerical value for each of the correction parameters in the application for image correction, adjusting the correction parameters such as exposure, sharpness, vignette, etc. through an adjustment bar may be the first user command, and the electronic device 100 can obtain a second image in which exposure, sharpness, vignette, etc. are changed according to the first user command.

"The first image" may refer to an original image before the second image is obtained, and the "second image" may refer to a corrected image of the first image. The first image and the second image may be used for learning by a neural network model as described below. In the disclosure, the "original image" may not only mean an image in which no correction is performed after the image is obtained by the electronic device 100 or an external device. In other words, the original image may be determined relative to an image obtained by performing a correction on the original image.

The original image and the corrected image corresponding to the original image may be distinguished from each other based on metadata. Specifically, the first image and the second image may be distinguished on the basis of the first metadata and the second metadata corresponding to each of the first image and the second image.

First, when each of the first image and the second image is obtained, the electronic device 100 may obtain first metadata corresponding to the first image and second metadata corresponding to the second image. For example, the first metadata and the second metadata may include information about at least one of a generation time, a generation device, and a correction time of the first image and the second image, respectively. At least one of the first metadata and the second metadata may include various information such as a generation location, a picture quality, a storage format, or the like, of the image. In particular, at least one of the first metadata and the second metadata may be obtained with an image file format, such as an exchangeable image file format (EXIF).

When the first metadata and the second metadata are obtained, the electronic device 100 can identify whether the first image and/or the second image is an original image or the corrected image based on the first metadata and the second metadata. For example, the electronic device 100 may identify, in the learning data, an image having the earliest correction time among a plurality of images with the same photographing time and the photographing device as the original image, and the image of which the correction time is later than the earliest correction time associated with the original image as the corrected image. As another example, the electronic device 100 may identify, in the learning data, an image of which correction time is the earliest among the plurality of images of which the generation place is the same as the original image, and the image of which the correction time later than the original image as the corrected image.

As described above, when the original image and the corrected image are distinguished or identified, the electronic device 100 may input the original image and the corrected image to a neural network model, and train the neural network model.

When the first image and the second image are obtained, the electronic device 100 may train the neural network model for obtaining an output image which is obtained by correcting the input image based on the first image and the second image in operation S130. Here, the "neural network model" may refer to an artificial intelligence model including a neural network. The term neural network model may be used interchangeably with the term artificial intelligence model.

Specifically, the electronic device 100 may train, based on the first image and the second image, such that the neural network model outputs the corrected image from the original image, or train the neural network model to output information for at least one correction parameter related to the correction of the original image.

In the disclosure, it will be described that the neural network model is trained based primarily on a pair of images of the first image and the second image for convenience, but the neural network model according to one or more embodiments can be trained based on learning data including an image corrected by the setting of the user and the original image of various pairs, and the learning effect of the neural network model can be improved as the amount of the original image and the corrected image included in the learning data increases. That is, in the learning process of the neural network model, the first image and the second image may refer to one image set which is randomly picked from among a plurality of sets of images included in the learning data.

The learning of the neural network model according to one or more embodiments may be performed under various conditions. Specifically, the learning process of the neural network model may be performed under the condition that an original image and a correction image corresponding to the original image are obtained by the electronic device. In other words, once the original image and the corrected image corresponding to the original image are obtained, the electronic device 100 may input the obtained original image and the correction image to the neural network model to train the neural network model.

In addition, the learning process of the neural network model may be performed under certain conditions. Specifically, the electronic device 100 can train the neural network model based on the power supply of the electronic device 100 and the frequency of use of the electronic device 100 by the user. For example, when the power supply of the electronic device 100 is sufficient (e.g., greater than equal to 50% of battery), the electronic device 100 may be able to provide enough power to train the neural network model. As another example, when the frequency of use of the electronic device 100 by the user is low, the learning process of the neural network model can be performed to reduce load on the electronic device. The frequency of use can be identified, for example, based on information, such as movement of the electronic device sensed by a gyro sensor or the like.

In operation S140, when a second user command for correcting a third image is received, a fourth image may be obtained by correcting the third image using the trained neural network model in operation S130.

Here, "the third image" may refer to a new original image different from the first image and the second image, and may be an image newly photographed by the user or an image captured by the screen displayed on the electronic device 100. The third image refers to an original image before the fourth image is obtained, and the "fourth image" refers to an image obtained by correcting the third image. That is, the term third image and the fourth image are also used in relative terms between an original image and an image obtained by performing correction on the original image, similar to the first image and the second image. However, the first image and the second image may be used for training a neural network model according to an embodiment, whereas the third image is an input image to the trained neural network model after the neural network model is trained based on the first and the second images, and the fourth image is an output image obtained by using the trained neural network model.

As described above, the "first user command" is a user command for obtaining a corrected image based on the user's correction parameter setting, whereas the "second user command" may refer to a user command for obtaining a corrected image through the neural network model according to an embodiment. For example, the second user command may be received according to a user input for selecting a particular user interface (UI) in a user interface provided through an application for image correction. The second user command may be provided according to a user input for selecting one of a plurality of thumbnail images, where a plurality of thumbnail images corresponding to the plurality of original images are provided through an application for reading the image. In addition, when information indicating whether correction for the original image corresponding to the thumbnail image is possible among the plurality of thumbnail images, the second user command may be received to select one of the thumbnail images displayed as correctable. An example of a specific user interface for inputting a second user command will be described in more detail with reference to FIG. 4A.

The neural network model according to an embodiment may include a first neural network model including a generator trained to generate an image and a comparator trained to distinguish or identify a plurality of images. The neural network model may include a second neural network model including an implementor trained to obtain information about at least one correction parameter related to correction of an image and a comparator trained to distinguish or identify a plurality of images. For example, the first neural network model may be a generative adversarial network (GAN) model, but the neural network model according to the embodiments of the disclosure is not limited thereto. Hereinafter, an example in which the neural network model is implemented as the first neural network model and an example in which the neural network model is implemented as the second neural network will be described in more detail.

First, in a case of the neural network model being implemented as a first neural network model, when a second user command for correcting a third image different from the first image and the second image is received, the electronic device 100 can input the third image to the trained first neural network model to obtain a fourth image which is obtained by correcting the third image.

Specifically, after the learning process for the first neural network model is performed, when a second user command for correcting the third image is received, the electronic device 100 can obtain the fourth image by correcting the third image using the trained first neural network model. The first neural network model according to an embodiment will be described with reference to FIGS. 2A and 2B.

Second, when the neural network model is implemented as a second neural network model, if a second user command for correcting a third image different from the first image and the second image is received, the electronic device 100 can obtain information about at least one correction parameter related to the correction of the third image by the neural network model in the trained neural network model, and obtain a fourth image by correcting the third image based on the information of the at least one correction parameter.

Specifically, when a second user command for correcting a third image is received after the learning process for the first neural network model is performed, the electronic device 100 can obtain information about at least one correction parameter related to the correction of the third image by using the trained second neural network model. When information about at least one correction parameter related to the correction of the third image is obtained, the electronic device 100 can obtain a fourth image by correcting the third image based on the at least one correction parameter. The second neural network model according to an embodiment will be described with reference to FIGS. 3A and 3B.

An embodiment in which a fourth image is obtained based on a second user command is described above, but the disclosure is not limited thereto. According to another embodiment of the disclosure, the electronic device 100 may obtain a fourth image by correcting the third image, under the condition that the third image is obtained by the electronic device. In other words, if the third image is obtained, the electronic device 100 may automatically obtain the fourth image even if the second user command is not received from the user.

As a result, according to various embodiments of the disclosure as described above with reference to FIG. 1, the electronic device 100 can train a neural network model based on learning data including an original image and a corrected image based on user setting. The electronic device 100 may obtain the corrected image to match the correction pattern that the user prefers using the trained first neural network model, or may obtain information about the correction parameter corresponding to the correction pattern preferred by the user using the trained second neural network model. In addition, the first neural network model and the second network neural model may be stored in the memory 110, and may be iteratively trained by the processor 120 accessing the memory 110.

Accordingly, the electronic device 100 may automatically correct the original image to improve the convenience of the user, and at the same time, may automatically apply the correction pattern preferred by the user learned by the neural network model, thereby providing the corrected image in a pattern preferred by each individual user.

Specific embodiments of the neural network model will be described in detail with reference to FIGS. 2A, 2B, 3A, and 3B.

Figure 2B:
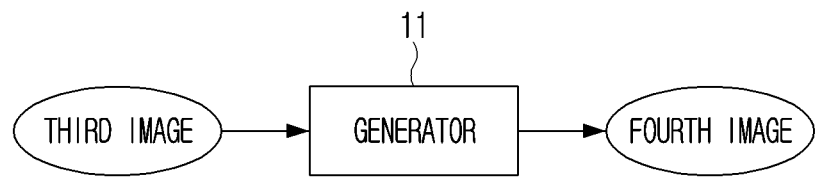
FIG. 2B is a diagram illustrating a process of training of a first neural network model and obtaining a corrected image using a trained first neural network model, according an embodiment.

FIGS. 2A and 2B are diagrams illustrating a process of training a first neural network model 10 and obtaining a corrected image using the trained first neural network model 10, according an embodiment.

Referring to FIG. 2A, a neural network model according to an embodiment of the disclosure may be a first neural network model 10 including a generator 11 and a comparator 12. The first neural network model 10 may be a GAN model, however the embodiment is not limited thereto.

The generator 11 is a neural network model configured to generate an image. Specifically, when an original image among a plurality of images is randomly picked from the learning data and input, the generator 11 may generate and output a corrected image based on the input original image. Here, that the image being input to the generator 11 may mean that the image data is input, and that a vector corresponding to the information included in the image may be obtained through a neural network, such as an embedder. The process of outputting the corrected image based on the input image may be performed by generating a corrected image by changing a pixel value of the image, or generating a corrected image by changing at least one parameter related to the correction of the image.

The comparator 12 may refer to a neural network model configured to distinguish a plurality of images. Specifically, if the generator 11 outputs the corrected image, the comparator 12 may compare the image generated by the generator 11 with the corrected image of the learning data to output feedback information. Here, the corrected image of the learning data may refer to a corrected image corresponding to the original image input to the generator 11 among the image sets (i.e., a first image and a second image) included in the learning data. The feedback information may include probability information about whether the image generated by the generator 11 is similar to the corrected image of the learning data.

Hereinafter, a process of training the first neural network model 10 constructed with the architecture described above will be described. First, in the case of the comparator 12, a probability value close to 1 may mean that the image generated by the generator 11 is substantially similar to the corrected image of the learning data, and a probability value close to 0 may mean that the image generated by the generator 11 is not similar to the corrected image of the learning data. A value obtained by adding the probability value when the image generated by the generator 11 is input to the comparator 12 and the probability value when the corrected image of the learning data is input to the comparator 12 can be a loss function of the comparator 12.

By updating a weight of the comparator 12, the loss function can be minimized, and the learning process of the comparator 12 can be performed. Specifically, the loss function value may be transmitted to the weight of each layer included in the generator 11 and the comparator 12 through back propagation to determine the direction and size of the update. The method of optimizing the weight in this manner is called a gradient descent method. However, the optimization method of the weight is not limited thereto, and may include other optimization methods.

The comparator 12 can be trained to obtain a probability value close to 1 when the image generated by the generator 11 is input to the comparator 12. That is, the difference between the probability value when the image generated by the generator 11 is input to the comparator 12 and 1 can be a loss function of the generator 11, and the weight of the generator 11 is updated in a manner that minimizes the value of the loss function so that the learning process of the generator 11 can be performed.

The generator 11 according to an embodiment of the disclosure may be trained to generate an image similar to the corrected image of the learning data, and the comparator 12 may be trained to distinguish or identify the image generated by the generator 11 and the corrected image of the learning data so that the generator 11 and the comparator 12 can be trained by adversarial learning. As a result, the generator 11 may generate and output an image that is substantially similar to the corrected image of the learning data.

Furthermore, the generator 11 may be trained based on several pairs of original images and corrected images included in pre-constructed learning data. Here, the corrected image included in the pre-constructed learning data may be an image corrected by an expert in the image correction field. When the generator 11 is trained on the basis of the pre-constructed learning data, the generator can generate a corrected image by reflecting the commonly used effects in the image correction field.

The generator 11 may be trained based on several pairs of original images and corrected images included in the learning data added by the user. Here, the learning data added by the user may include an original image obtained by the user of the electronic device 100 and an image corrected by the user setting. When the generator 11 is trained based on the learning data added by the user, the generator can generate the corrected image in a pattern preferred by the user.

Hereinafter, a process for implementing the first neural network by the electronic device 100 according to an embodiment of the disclosure will be described. First, the electronic device 100 may input a first image to the generator 11 of the first neural network model 10 to obtain a fifth image which is obtained by correcting the first image. Here, the "first image" may refer to the original image among a plurality of images that is randomly picked from the learning data as described above, and the "fifth image" may refer to an image generated and output by the generator 11 in the learning process of the first neural network model 10.

When the fifth image is obtained, the electronic device 100 may input a second image and a fifth image to the comparator 12 of the first neural network model 10 to obtain first feedback information related to a difference between the pixel value of the second image and the pixel value of the fifth image. Here, the "second image" may refer to an original image among a plurality of images that is randomly picked from the learning data as described above, and the "first feedback information" may include information about a loss function value obtained based on the difference between the pixel value of the second image and the pixel value of the fifth image.

In addition, the generator 11 may be trained based on the first feedback information. Specifically, the electronic device 100 can obtain a loss function value based on the difference between the pixel value of the second image and the pixel value of the fifth image, and back-propagate the loss function value to train the generator 11 so that the loss function value is minimized. That is, the generator 11 may be trained to minimize the difference between the second image obtained based on the user settings for the correction parameter and the fifth image output by the generator 11. The comparator 12 may be trained to distinguish between the second image obtained based on the user setting for the correction parameter and the fifth image output by the generator 11.

As described above, when the first neural network model 10 is trained based on the learning data including the first image and the second image, that is, the learning data including the several pairs of original images and the corrected image based on the user setting, the generator 11 included in the first neural network model 10 can generate and output an image that is substantially similar the image corrected based on the user setting.

After the learning process as described above is performed, the electronic device 100 can obtain the fourth image which is obtained by correcting the third image using the trained neural network model. Specifically, referring to FIG. 2B, when a second user command for correcting a third image different from the first image and the second image is received, the electronic device 100 may input the third image to the trained generator 11 to obtain a fourth image which is obtained by correcting the third image.

An embodiment in which the neural network model is the first neural network model 10 including the generator 11 and the comparator 12 has been described, and an embodiment in which the neural network model is the second neural network model including the implementor and the comparator 12 will be described below.

Figure 3A:
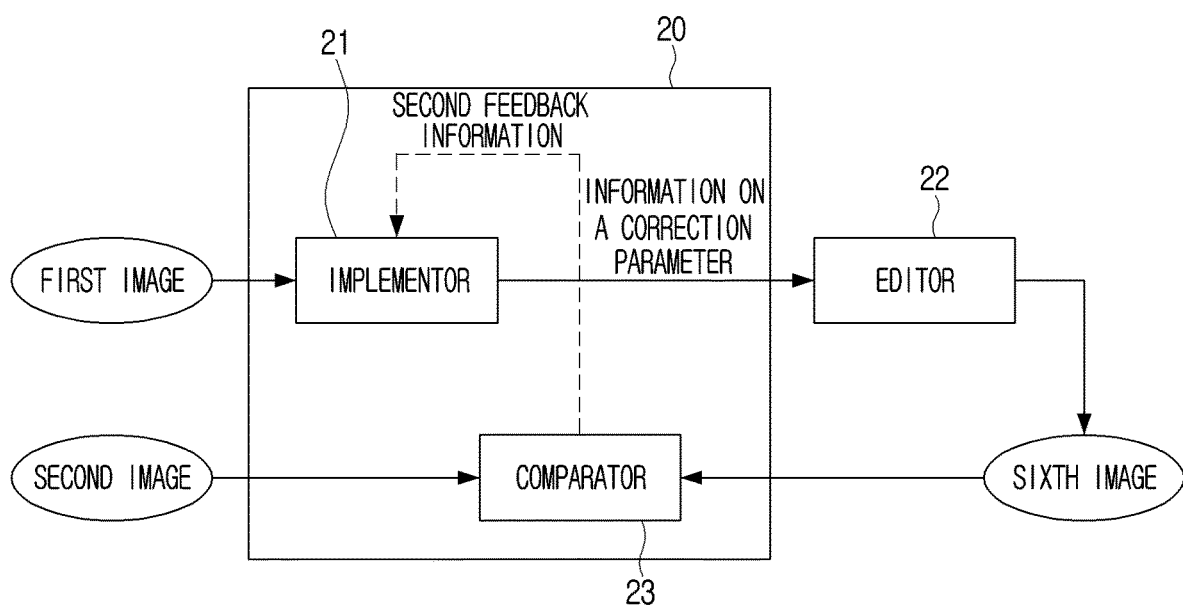
FIG. 3A is a diagram illustrating a process of training a second neural network model and a process of obtaining a corrected image according to an embodiment.
Figure 3B:
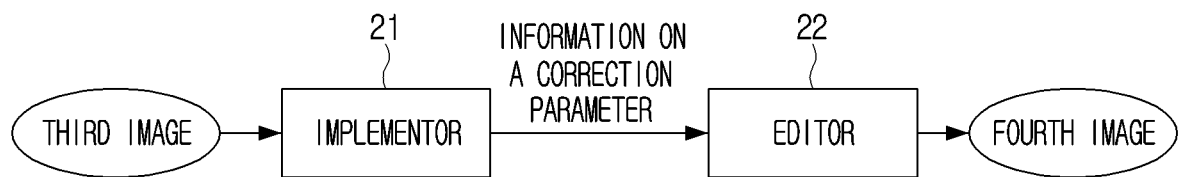
FIG. 3B is a diagram illustrating a process of training a second neural network model and a process of obtaining a corrected image according to an embodiment.

FIGS. 3A and 3B are diagrams illustrating a process of training a second neural network model 20 and a process of obtaining a corrected image using the trained second neural network model 20 according to an embodiment.

Referring to FIG. 3A, the neural network model according to an embodiment of the disclosure may be the second neural network model 20 that includes an implementor 21 and a comparator 23. Further, as shown in FIG. 3A, in the process of obtaining the corrected image using the learning process of the second neural network model 20 and the trained second neural network model 20, the editor 22 can be used with the implementor 21 and the comparator 23.

The implementor 21 refers to a neural network model configured to obtain information about at least one correction parameter related to correction of an image. When the original image among a plurality of images is randomly picked from the learning data and is input, the implementor 21 can obtain and output information about at least one correction parameter related to the correction of the image based on the input original image. Here, inputting an image to the implementor 21 may refer to obtaining a vector corresponding to information included in an image through a neural network, such as an embedder, and inputting the obtained vector as well as inputting the image itself, in the same manner as inputting the image to the generator 11. The process of obtaining information about at least one correction parameter related to the correction of the image may be performed through a process of identifying which correction parameter should be applied to the original image to generate a corrected image, or identifying a certain pixel value to generate a corrected image.

The editor 22 refers to a module configured to generate a corrected image based on information about at least one correction parameter. Specifically, when information about at least one correction parameter related to correction of an image is output through the implementor 21, the editor 22 can receive information about at least one correction parameter from the implementor 21. Further, based on the information about at least one correction parameter being input to the editor 22, the editor 22 can generate and output a corrected image based on information about at least one correction parameter.

In addition, referring to FIG. 3A, although it is indicated that only the information about at least one correction parameter is input to the editor 22, the original image can be input to the editor 22 along with the information about the at least one correction parameter. The implementor 21 can generate and output a corrected image by reflecting information about at least one correction parameter to the original image. The editor 22 may be implemented as a separate module distinct from the second neural network model 20, as shown in FIG. 3A, but may also be implemented as a module included in the second neural network model 20.

The comparator 23 refers to a neural network model configured to distinguish or identify a plurality of images, as in the case of the first neural network model. Specifically, if the editor 22 outputs the corrected image, the comparator 23 can compare the image generated by the editor 22 with the corrected image of the learning data to output feedback information. As described above, the corrected image of the learning data refers to a corrected image corresponding to the original image input to the generator among the image sets included in the learning data. The feedback information may include probability information about whether the image generated by the editor 22 is similar to the corrected image of the learning data.

Hereinafter, a process of training the second neural network model 20 constructed with the architecture as described above will be described. First, in the case of the comparator 23, the probability value close to 1 may indicate that the image generated by the editor 22 is substantially similar to the corrected image of the learning data, and the probability value close to 0 may indicate that the image generated by the editor 22 is not similar to the corrected image of the learning data. A value adding the probability value when the image generated by the editor 22 is input to the comparator 23 and the probability value when the corrected image of the learning data is input to the comparator 23 can be a loss function of the comparator 23. By updating the weight of the comparator 23 in a manner to minimize the value of the loss function, the learning process of the comparator 23 can be performed.

The comparator 23 can be trained to obtain a probability value close to 1 when the information about at least one correction parameter obtained by the generator is input to the comparator 23. That is, a difference between the probability value when the image generated by the editor 22 is input to the comparator 23 and a value 1 may be a loss function of the generator, and the weight of the generator is updated to minimize the value of the loss function so that a learning process of the generator can be performed.

In particular, the implementor 21 may be trained based on feedback information obtained by the comparator 23. The feedback information may include information about a correction parameter value to be modified to cause the image generated by the editor 22 to be an image similar to the corrected image of the learning data. More specifically, if an image is generated by the editor 22 based on the correction parameter output by the implementor 21, the corrected image of the image and learning data generated by the editor 22 may be input to the comparator 23. The comparator 23 may compare the image generated by the editor 22 and the corrected image of the learning data to obtain feedback information related to the difference between the pixel value of the image generated by the editor 22 and the pixel value of the corrected image of the learning data.

With respect to a learning method of the second neural network model 20, the learning method of the first neural network model as described above can be applied with reference to FIG. 3A, and some or all of overlapping description thereof will be omitted.

Hereinafter, a process for implementing an embodiment using the second neural network by the electronic device 100 will be described. First, the electronic device 100 may input a first image to a generator of the second neural network model 20 to obtain at least one correction parameter related to the correction of the first image. As described above, the at least one correction parameter may include at least one of hue, lightness, saturation, and contrast. In addition, the at least one correction parameter may include various correction parameters related to correction of the image, such as exposure, highlight, shadow, brightness, color temperature, noise, vignette, black point, or the like.

When at least one correction parameter related to the correction of the first image is obtained, the electronic device 100 may input at least one correction parameter related to the correction of the first image to the editor 22 to obtain a sixth image which is obtained by correcting the first image. The term "sixth image" may refer to an image output by the editor 22 based on the correction parameter output by the implementor 21 in the learning process of the second neural network model 20. The editor 22 may be implemented through an application for image correction, and may be embodied in a form included in the second neural network model 20.

When the sixth image is obtained, the electronic device 100 may input the second image and the sixth image to the comparator 23 to obtain second feedback information related to a difference between the pixel value of the second image and the pixel value of the sixth image. The "second feedback information" may include information about a loss function value obtained based on a difference between a pixel value of the second image and a pixel value of the sixth image.

The implementor 21 can be trained based on the second feedback information. As described above, the learning method with respect to the first neural network model can also be applied to a learning method for the second neural network model 20, and thus a detailed description thereof will be omitted.

If the learning process as described above is performed on the basis of pairs of images included in the learning data, the implementor 21 can obtain a similar correction parameter to the correction parameter set by the user. The editor 22 can generate and output an image similar to the corrected image based on the user setting on the basis of the information about at least one correction parameter obtained by the implementor 21.

Further, after the learning process as described above is performed, the electronic device 100 can obtain the fourth image by correcting the third image using the trained neural network model. Specifically, referring to FIG. 3B, when a second user command for correcting a third image different from the first image and the second image is received, the electronic device 100 may obtain information about at least one correction parameter related to the correction of the first image in the trained neural network model, and obtain a fourth image by correcting the third image based on the information about the at least one correction parameter.

FIGS. 4A to 4D are diagrams illustrating a user interface according to various embodiments.

Figure 4A:
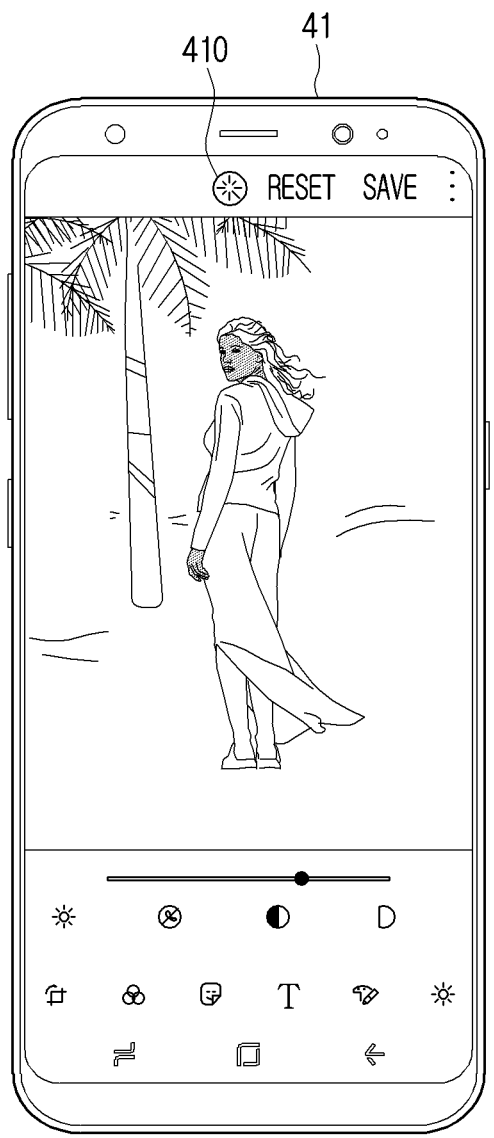
FIGS. 4A, 4B, 4C, and 4D are diagrams illustrating user interfaces according to various embodiments.

FIG. 4A illustrates a first user interface 41 according to an embodiment. The first user interface (UI) 41 may include a third image, which is an original image, and a first user interface element 410. In the third image shown in FIG. 4A, a "face portion of a person" and a "hand portion of a person" are shaded, to represent a portion having a lower lightness than the corrected image in the original image.

The second user command for correcting the third image through the neural network model according to the embodiments of the disclosure can be input based on a user interaction touching the first UI element 410 of FIG. 4A. When the second user command is received based on a user interaction touching the first UI element 410, the electronic device 100 can use the trained neural network model to obtain a fourth image by correcting the third image.

Figure 4B:

FIG. 4B illustrates a second user interface 42 including a fourth image obtained according to the process described with reference to FIG. 4A. Specifically, the second user interface 42 may include the fourth image a second UI element for selecting whether to correct the fourth image. In the fourth image shown in FIG. 4B, the "hand portion of a person" is shaded, but there is no shade in the "face portion of a person," which is to indicate that the lightness of the "face portion of the person" is corrected to be higher by the correction through the neural network model. The electronic device 100 may obtain a fourth image in which the lightness for the "face portion of a person" of the third image, which is the original image, is corrected.

The second user interface 42 may include a second UI element 420 for selecting whether to additionally correct the fourth image based on the user setting for the correction parameter. For example, if a user input is received on the "OK" interface displayed on the second UI element 420 as shown in FIG. 4B, the electronic device 100 may determine that the fourth image does not need to be additionally corrected based on the user setting for the correction parameter, and may store the fourth image. If a user input is received on the "edit more" interface of the second UI 420 as shown in FIG. 4B, the electronic device 100 may additionally correct the fourth image based on the user setting.

Figure 4C:
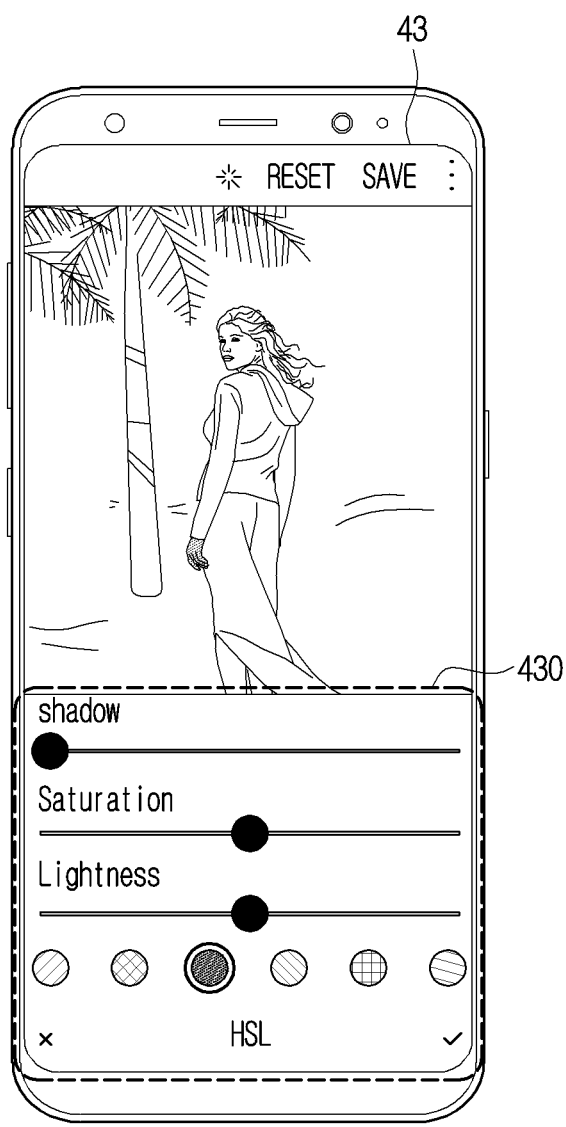

FIG. 4C illustrates a third user interface 43 displayed when it is determined that the fourth image is to be additionally corrected based on the user's setting according to the procedure described with reference to FIG. 4B.

The third user interface 43 may include a third UI element 430 as shown in FIG. 4C. Specifically, if it is determined that the fourth image is to be additionally corrected based on the user setting, the electronic device 100 may display a third user interface 43 that includes a third UI element 430 for selecting parameters such as "shadow", "saturation" and "lightness". The third UI element 430 may include at least one of a parameter such as a frequency of use of the user. That is, a parameter indicating how frequently the user uses one or more of the parameters displayed on the third UI element 430. Further, when a fourth user command for selecting at least one parameter related to the correction of the fourth image is received through the second UI element 430, the electronic device 100 can obtain and display a seventh image which is obtained by correcting the fourth image.

Figure 4D:
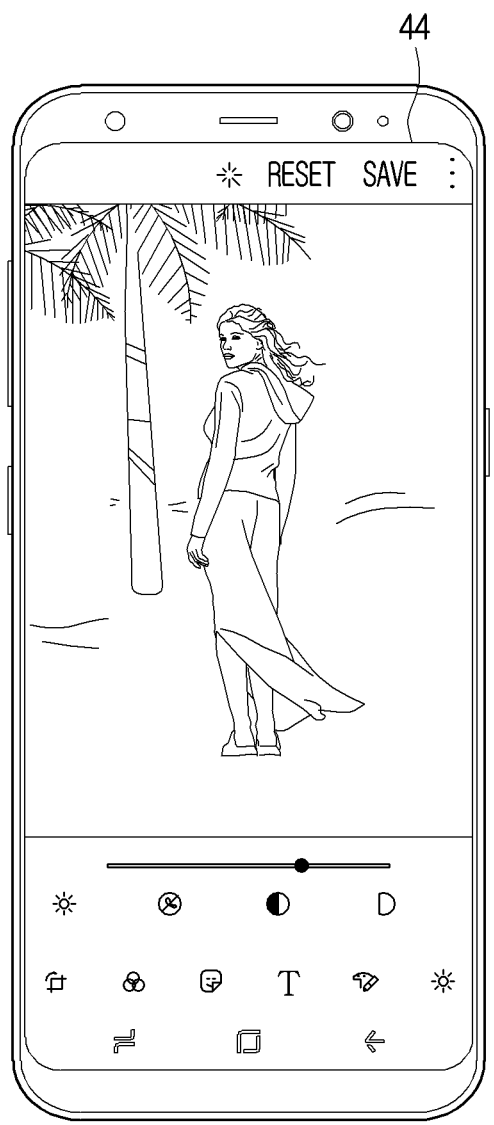

FIG. 4D illustrates a fourth user interface 44 displayed when the user setting for the correction parameter is performed through the third UI element 430 described with reference to FIG. 4C.

The fourth user interface 44 may include a seventh image which is obtained by correcting the fourth image. For example, in the seventh image shown in FIG. 4D, no shading processing is performed for both the "face portion of a person" and the "hand portion of a person", indicating that the lightness for the "hand portion of a person" has been corrected to be high by the user setting after the lightness of the "face portion of a person" has been corrected to be high by correction through the neural network model. The electronic device 100 may obtain a seventh image by correcting the lightness for the "hand portion of a person" of the fourth image, which may be used as the original image.

If the seventh image which is obtained by correcting the fourth image, the electronic device 100 may train the neural network model based on the third image and the seventh image. In other words, the third image, which is an original image, and the seventh image, which is an image corrected according to an embodiment as described with reference to FIGS. 4A to 4D, can also be included in learning data used for training a neural network model according to the disclosure.

Figure 5:
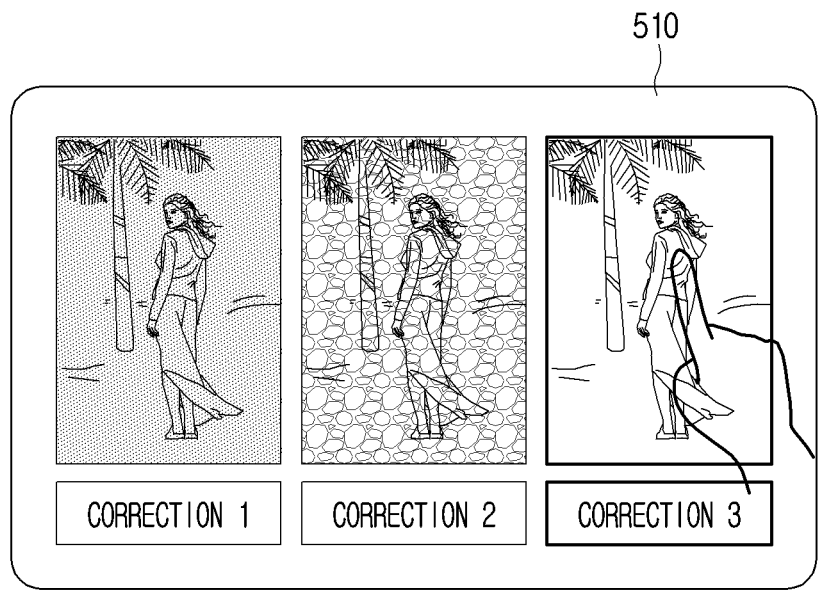
FIG. 5 is a diagram illustrating a user interface according to an embodiment.
Figure 6A:
FIGS. 6A and 6B are diagrams illustrating user interfaces according to various embodiments.
Figure 6B:

FIGS. 5, 6A and 6B are diagrams illustrating a user interface according to various embodiments.

Referring to FIG. 4B, when a second user command for correcting the original image is received through the neural network model, the electronic device 100 obtains one corrected image corresponding to the original image through the trained neural network model, and further corrects the one corrected image by the user setting, but the embodiment is not limited thereto.

As shown in FIG. 5, when a second user command for correcting an image is received through a neural network model, the electronic device 100 may obtain a plurality of corrected images corresponding to the original image through a neural network model and display a fifth user interface 510 that includes the obtained plurality of corrected images. When a user command for selecting one of the plurality of corrected images is received through the fifth user interface 510, the electronic device 100 may store the selected image as a corrected image and train the neural network model based on the original image and the selected corrected image.

According to an embodiment, the electronic device 100 may display a sixth user interfaces 610 and 620 for selecting whether to change a correction parameter in a predefined manner to obtain a corrected image, or obtain a corrected image through a neural network model. For example, as shown in FIGS. 6A and 6B, the sixth user interfaces 610 and 620 may include a recommendation list that includes a UI element ("contrast", "brighten" and "soften") for selecting a pre-defined correction scheme and a UI element ("AI recommendation") for selecting to obtain a corrected image through the neural network model.

In this example, an order of displaying the plurality of UI elements may be changed as the corrected image is obtained by the user setting. In particular, as shown in FIG. 6A, if the number of the corrected images is not large in the learning data, the UI element for selecting the correction method frequently used by the user may be displayed as an upper item of the recommendation list, and the UI element for selecting the correction method through the neural network model can be displayed as a lower item of the recommendation list displayed on the user interface 610. As shown in FIG. 6B, when the number of the corrected images is increased in the learning data, the neural network model may provide a corrected image in patterns preferred by each of the individual users. Here, the electronic device 100 may display an UI element (e.g., "AI recommendation") for selecting one of the correction methods to obtain the corrected image through the neural network model in the recommendation list on the sixth user interface 620. Specifically, the UI element of AI recommendation may be displayed on the sixth user interface 620, such that the AI recommendation is displayed at a higher position on the recommendation list than other UI elements (e.g., "contrast," "brighten" and "soften") for selecting a predetermined correction method. Here, the electronic device 100 may determine whether the number of corrected images is large or not based on a predetermined value.

Figure 7:
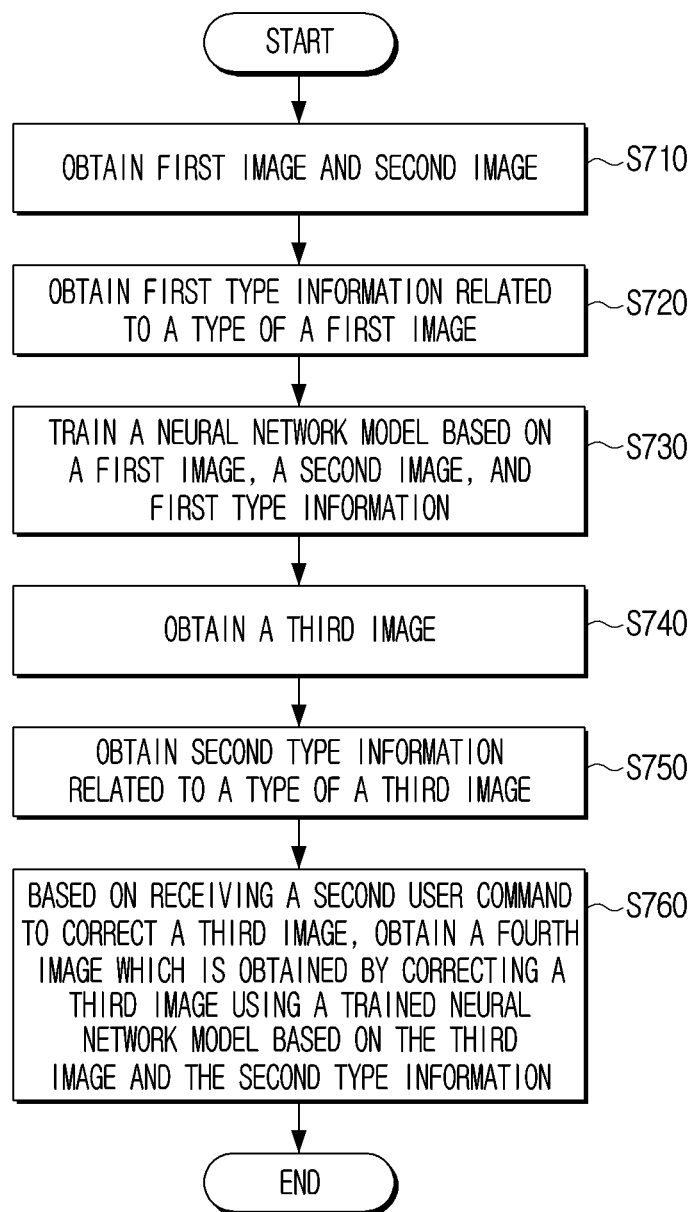
FIG. 7 is a flowchart illustrating a process of performing correction of an image according to a type of an image according to an embodiment.

FIG. 7 is a flowchart illustrating a method of performing correction of an image according to a type of an image, according to an embodiment.

A method for training a neural network model based on a first image and a second image, and obtaining a fourth image which is obtained by correcting a third image using the trained neural network model is described, but the correction pattern preferred by the user may vary depending on the type of the image. For example, the user may prefer to correct (e.g., increase the brightness value) a region of an image corresponding to the "face" of a person if the person is included in the image, and may prefer to correct (e.g., increase the sharpness value) another region of the image corresponding to the "a leaf of a plant" if the plant is included in the image.

Accordingly, the electronic device 100 may perform various corrections for an image depending on the type of image, and this will be described in detail with reference to FIG. 7.

As described above, the electronic device 100 may obtain a first image that is an original image and a second image by correcting the first image in operation S710. The electronic device 100 may obtain first type information related to the type of the first image and the type of the second image in operation S720.

Here, the term first type information may refer to all information that can be used to classify the type of the first image. For example, the first type information may include at least one of information about an object included in the first image, information about a place where the first image is photographed, and information about the time at which the first image is photographed.

In particular, the information about the object included in the first image may be obtained through the following process. First, the electronic device 100 can extract a boundary in the first image to identify the presence of the object and the location of the object. For example, the electronic device 100 may identify at least one object included in the first image through 2D image matching, optical character recognition (OCR), artificial intelligence model for object recognition, or the like. More specifically, the electronic device 100 can extract features of an object included in the first image using various methods, such as edge detection, corner detection, histogram feature detection, image high frequency analysis, image variance analysis, or the like. The electronic device 100 may obtain a probability that an object included in the first image corresponds to each of a plurality of categories for classifying an object based on the extracted feature, and identify at least one object included in the third image.

The electronic device 100 may identify at least one object included in the first image through the trained object recognition model. Specifically, the electronic device 100 may input the first image to the trained artificial intelligence model to identify at least one object included in the image. Here, the object recognition model can be an artificial intelligence model trained by using at least one of artificial intelligence algorithms such as machine learning, neural networks, genes, deep learning and classification algorithms, and can include at least one artificial neural network between a convolutional neural network (CNN) and a recurrent neural network (RNN). However, there is no limitation on the type of the object recognition model and the type of artificial neural network included in the object recognition model.

The object recognition model according to an embodiment of the disclosure may include a detailed model implemented for each type of an object, such as a user recognition model, a food recognition model, and a user recognition model. A face recognition model for recognizing the face of the user at more granular level than the user recognition model and an emotion recognition model for recognizing the user and the emotion of the user, respectively, based on the facial expression of the user, or the like. At least some of the above models may operate based on a predefined rule that may not be artificial intelligence.

The information regarding a place where the first image is photographed and the time at which the first image is photographed may be obtained in the form of metadata as described above with the acquisition of the first image. In particular, the information regarding the place where the first image is photographed may be obtained based on information about the background among the objects included in the first image, and may be obtained based on global positioning system (GPS) information obtained based on the sensor included in the electronic device 100.

Once the first type information is obtained, the electronic device 100 can train the neural network model based on the first image, the second image, and the first type information in operation S730. Specifically, an example of implementing the neural network model as a single neural network model is described, but the neural network model according to the embodiments of the disclosure may include a plurality of neural network models divided according to the type of the input image. The electronic device 100 may identify a neural network model corresponding to the type of the first image among the plurality of neural network models based on the first type information as described above, and perform learning by each of the plurality of neural network models by inputting the first image and the second image to the neural network model identified as corresponding to the type of the first image. For example, if it is identified that the first image includes an object of "person" based on the first type information, the electronic device 100 may identify a neural network model for correction of the "person" among the plurality of neural network models and train the identified neural network model based on the first image and the second image. As another example, if it is identified that the photographing space of the first image is "a region" based on the first type information, the electronic device 100 may identify a neural network model for correction of an image in which the photographing space of the plurality of neural network models is "a region", and train the identified neural network model based on the first image and the second image.

As described above, the electronic device 100 may obtain a third image that is a new original image different from the first image and the second image in operation S740. If the third image is obtained, the electronic device 100 may obtain second type information related to the type of the third image in operation S750. The term second type information is used herein to refer to all information that can be used to classify the type of the third image. Specifically, the second type information may include at least one of information about the object included in the third image, information about a place where the third image is photographed, and information about the time at which the third image is photographed.

When the second user command for correcting the third image is received, the electronic device 100 may obtain the fourth image which is obtained by correcting the third image using the trained neural network model based on the third image and the second type information in operation S760. The electronic device 100 may identify a neural network model corresponding to the type of the third image among the plurality of neural network models trained by the types of the image based on the second type information as described above, and input the third image to the identified neural network model corresponding to the type of the third image to obtain a fourth image by correcting the third image.

For example, if it is identified that the third image includes an object of "person" based on the second type information, the electronic device 100 may identify a neural network model for correction of the "person" among the trained plurality of neural network models, and input a third image to the identified neural network model to obtain a fourth image by correcting the third image. As another example, if it is identified that the photographing place is "A region" based on the second type information, the electronic device 100 may identify a neural network model for correction of the "A region" of the trained plurality of neural network models, and may obtain a fourth image correcting the third image that is input to the identified neural network model.

An example that the first image and the third image include the object "person" has been described, but the type of the image can be classified in various manners, such as "a specific person X". In addition, the type and breadth/narrowness of categories for classifying types of images may be implemented in a variety of ways depending on the design.

An example that a place where the first image and the third image are photographed is "A region" is described, but after the neural network model for correcting an image which is photographed at a place of "A region" (e.g., A region famous of aurora), among the plurality of neural network models, based on the first image, if the third image which is photographed at a "B region (e.g., B region famous of aurora as A region) similar to A region" is obtained, the neural network model for correcting the image which is photographed at "A region" may be used for correcting the third image.

An example of identifying the neural network model corresponding to the type of the first image among the plurality of neural network models based on the first type information and performing learning by as plurality of neural network models by inputting the first image and the second image to the neural network model identified as corresponding to the type of the first image is described, but the process of identifying a neural network model corresponding to the type of the first image among a plurality of neural network models and performing learning based on the first image and the second image may be implemented through one neural network model, based on the information about the first type.

Although the neural network model according to the embodiments of the disclosure may be implemented among a plurality of neural network models depending on the type of image, the neural network model may be implemented as one integrated neural network model, and the electronic device 100 may input the first type information together with the first image and the second image to the neural network model to train the neural network model.

Figure 8A:
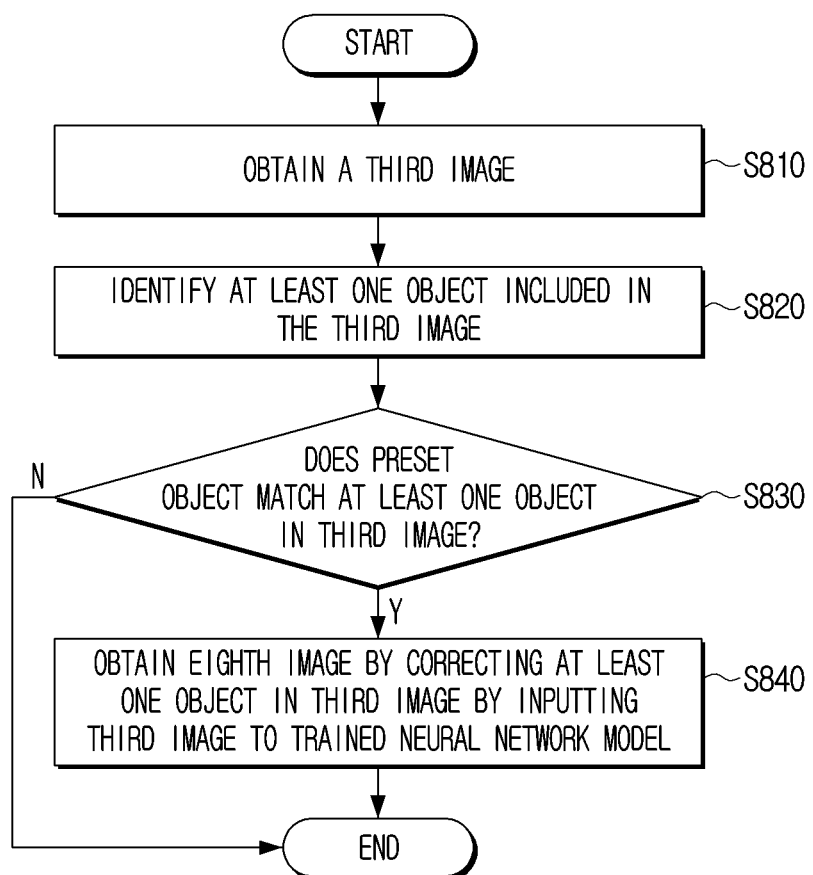
FIG. 8A is a flowchart illustrating a process of performing correction of an image by identifying an object included in an image according to an embodiment.
Figure 8B:
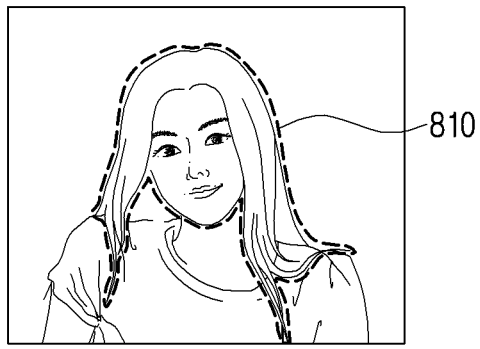
FIG. 8B is a diagram illustrating a process of performing correction of an image by identifying an object included in an image according to an embodiment.

FIGS. 8A and 8B are diagrams illustrating a method of performing correction of an image by identifying an object included in an image.

FIG. 8A is a flowchart illustrating a method of performing correction of an image by identifying an object included in an image, and FIG. 8B is a diagram illustrating identifying an object included in an image.

If the third image is obtained in operation S810, the electronic device 100 may identify at least one object included in the third image in operation S820. Since a method for identifying an object included in an image has been described in detail with reference to FIG. 7, a description thereof will be omitted.

For example, the electronic device 100 may identify, through a method as described above, an object 510 that includes a face, head, and hair portion of the person in a third image including the person, as shown in FIG. 8B.

If at least one object included in the third image is identified, the electronic device 100 can determine whether to perform a correction on the third image based on a preset object substantially matching a target object of correction in the identified at least one object. For example, a preset object may be obtained based on the learning data for training the neural network model, and may be stored in a memory of the electronic device.

Specifically, if a preset object substantially matches a target object in the identified at least one object for which the correction is to be performed (operation S830-Y), the electronic device 100 can input a third image to the trained neural network model to obtain an eighth image in which the target object among the at least one object included in the third image is corrected in operation S840.

The term "correction" refers to a correction performed on an image using a neural network model according to the embodiments of the disclosure. Here, the matching a preset object to a target object of correction may mean that, if a preset object (e.g., a plant) is included or substantially matches a target object among the at least one object identified in another image, correction is performed using the neural network model in the electronic device 100. Furthermore, if it is determined that the identified target object is frequently corrected by a user, a correction may be performed using the neural network model according to at least one parameter that was previously used by the user to correct an image including the preset object.

Referring to FIG. 8B, if the electronic device 100 may be preset to perform correcting using the neural network model when an object 810 (i.e., a person) including the face, the head, and the hair are included in the third image. For example, if the object 810 is identified as including the face, the head, and the hair part of the person, the electronic device 100 may input the third image to the trained neural network model to obtain the eighth image in which the object 810 is corrected, among the at least one object included in the third image.

If the preset object is not included as the object which is a target of correction in the identified at least one object in operation S830-N, the electronic device 100 may not perform the correction for the third image using the trained neural network model.

According to an embodiment as described above with reference to FIGS. 8A and 8B, the electronic device 100 can provide a higher user satisfaction by performing a correction using a neural network model only for an image including an object that a user wishes to correct.

Figure 9:
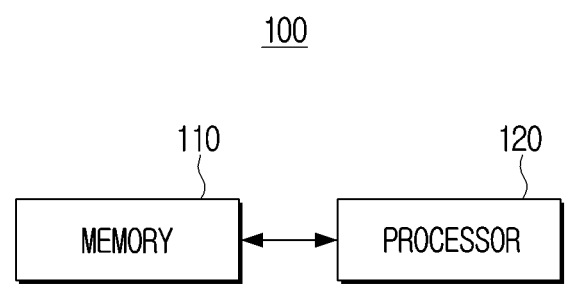
FIGS. 9 and 10 are block diagrams illustrating an electronic device according to various embodiments.
Figure 10:
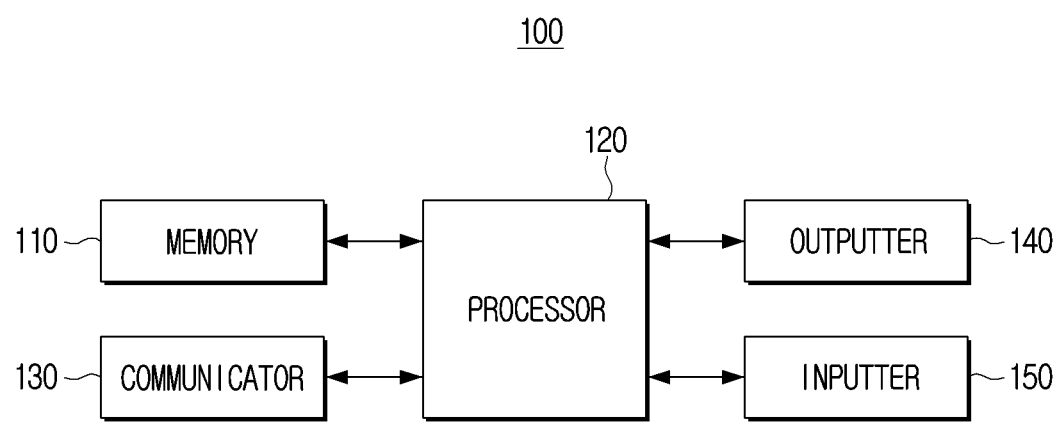

FIGS. 9 and 10 are block diagrams illustrating an electronic device 100.

FIG. 9 is a block diagram illustrating an electronic device 100 according to an embodiment, and FIG. 10 is a block diagram illustrating an electronic device 100 according to an embodiment.

As shown in FIG. 9, the electronic device 100 includes a memory 110 and a processor 120. As shown in FIG. 10, the electronic device 100 may further include a communicator 130, an inputter 150, and an outputter 140. However, the embodiments of the electronic device 100 are only examples and a new configuration may be added or some configuration may be omitted in addition to the embodiments described herein.

At least one instruction regarding the electronic device 100 may be stored in the memory 110. In addition, an operating system (O/S) for driving the electronic device 100 may be stored in the memory 110. The memory 110 may store various software programs or applications for operating the electronic device 100 according to various embodiments. The memory 110 may include a semiconductor memory such as a flash memory, a magnetic storage medium such as a hard disk, or the like.

Specifically, the memory 110 may store various software modules for operating the electronic device 100, and the processor 120 may control the operation of the electronic device 100 by executing various software modules that are stored in the memory 110. That is, the memory 110 may be accessed by the processor 120, and may perform reading, recording, modifying, deleting, updating, or the like, of data by the processor 120.

The memory 110 may refer to any volatile or non-volatile memory, a read-only memory (ROM), a random access memory (RAM) communicatively coupled to or in the processor 120 or a memory card (for example, a micro SD card, a memory stick) connectable to the electronic device 100.

In various embodiments according to the disclosure, the memory 110 may store learning data for training a neural network model, information on first to eighth images, first feedback information and second feedback information, first metadata information and second metadata information, or the like. In addition, various information necessary to achieve the objectives of the disclosure may be stored in memory 110, and information stored in the memory 110 may be received from a server or an external device or updated through input by a user.

The processor 120 controls an overall operation of the electronic device 100. Specifically, the processor 120 may be connected to and configured to control the operations of the memory 110, the communicator 130, the outputter 140, and the inputter 150, and may control the operation of the electronic device 100 by executing at least one command stored in the memory 110.

The processor 120 may be implemented in a variety of ways. For example, the processor 120 may be implemented as at least one of an application specific integrated circuit (ASIC), an embedded processor, a microprocessor, hardware control logic, a hardware finite state machine (FSM), a digital signal processor (DSP), or the like. The term processor 120 in the disclosure can be used in a sense including a central processing unit (CPU), a graphic processing unit (GPU), a main processing unit (MPU), or the like.

In particular, in various embodiments, the processor 120 may, by executing at least one instruction, obtain a first image, based on receiving a first user command to correct the first image, obtain a second image which is obtained by correcting the first image, based on the first image and the second image, train a neural network model for obtaining an output image which is obtained by correcting an input image, and based on receiving a second user command to correct a third image, obtain a fourth image which is obtained by correcting a third image using the trained neural network model. Since various embodiments according to the disclosure based on the control of the processor 120 have been described above with reference to FIGS. 1 to 8B, a description thereof will be omitted.

The communicator 130 includes a circuitry or an interface, and can perform communication with a server or an external device. Specifically, the processor 120 may receive various data or information from a server or an external device connected through the communicator 130, and may transmit various data or information to a server or an external device.

The communicator 130 may include at least one of a Wi-Fi module, a Bluetooth module, a wireless communication module, and a near field communication (NFC) module. To be specific, the Wi-Fi module may communicate by a Wi-Fi method and the Bluetooth module may communicate by a Bluetooth method. When using the Wi-Fi module or the Bluetooth module, various connection information such as service set identifier (SSID) may be transmitted and received for communication connection and then various information may be transmitted and received.

The wireless communication module may communicate according to various communication specifications such as IEEE, Zigbee, $3^{rd}$ generation (3G), $3^{rd}$ generation partnership project (3GPP), long term evolution (LTE), $5^{th}$ generation (5G), or the like. The NFC module may communicate by the NFC method using a 13.56 MHz band among various RF-ID frequency bands such as 135 kHz, 13.56 MHz, 433 MHZ, 860~960 MHz, 2.45 GHz, or the like.

In various embodiments, a plurality of images included in learning data for training a neural network model may be received from an external device through the communicator 130.

The neural network model may be included in a form of an on-device in the electronic device 100, as well as included in a server external to the electronic device 100. When the neural network model is included in a server external to the electronic device 100, the electronic device 100 can implement various embodiments using a neural network model of the server. For example, if a second user command for correcting the third image is received, the electronic device 100 may control the communicator 130 to transmit a control command corresponding to the second user command together with the third image to the server, and receive and obtain the fourth image which is obtained by correcting the third image from the server through the communicator 130.

The outputter 140 includes a circuitry, and the processor 120 can output various functions that the electronic device 100 can perform through the outputter 140. The outputter 140 may include at least one of a display, a speaker, and an indicator.

The display may output image data under the control of the processor 120. Specifically, the display may output an image pre-stored in the memory 110 under the control of the processor 120. In particular, the display according to an embodiment may display a user interface stored in the memory 110.

The display may be implemented as a liquid crystal display (LCD) panel, organic light emitting diodes (OLED), or the like, and the display may also be implemented as a flexible display, a transparent display, or the like. However, the display is not limited thereto. The speaker may output audio data under the control of the processor 120, and the indicator may be turned on by the control of the processor 120.

According to the embodiments of the disclosure, the display may display various types of images, and may display various types of user interfaces as shown in FIGS. 4A-4D, 5 and 6A-6B.

The inputter 150 includes a circuitry configured to receive an input from a user or other devices, and the processor 120 may receive a user command for controlling the operation of the electronic device 100 through the inputter 150. Specifically, the inputter 150 may include a microphone, a camera, and a remote control signal receiver, or the like. The inputter 150 may be embodied as a touch screen in a form of a display.

According to various embodiments of the disclosure, a first user command and a second user command for correcting an image may be input through the inputter 150. For example, at least one of the first user command and the second user command may be input in the form of a user interaction through the touch screen, and may be input in the form of a voice signal through a microphone. The processor 120 may obtain the original image according to the disclosure through the camera.

The controlling method of the electronic device 100 according to the aforementioned embodiment may be implemented as a program and provided to the electronic device 100. In particular, a program including the controlling method of the electronic device 100 may be stored in a non-transitory computer readable medium and provided.

Specifically, a computer-readable recording medium comprising a program for executing a control method of the electronic device 100 includes obtaining a first image: based on receiving a first user command to correct the first image, obtaining a second image obtained by correcting the first image: training a neural network model for obtaining an output image which is obtained by correcting an input image, and based on receiving a second user command for correcting a third image, obtaining a fourth image which is obtained by correcting the third image using the trained neural network model.

The non-transitory computer readable medium refers to a medium that stores data semi-permanently rather than storing data for a very short time, such as a register, a cache, the memory 110, etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

According to various embodiments as described above, the electronic device 100 may automatically correct an original image to improve the convenience of a user and the accuracy of the image processing by automatically reflecting a correction pattern preferred by a user in correcting an image, thereby providing an image corrected to a pattern preferred by each individual user.

Further, according to various embodiments, unlike merely converting a style of an image in the related art, a neural network model can be trained by detecting a minute difference between an original image and a corrected image, thereby enabling a user to apply a more natural correction effect for correcting a person and a landscape or the like, which is frequently used by a user.

A function associated with artificial intelligence according to the embodiments of the disclosure operates through a processor and a memory. The processor may be configured with one or a plurality of processors. The one or a plurality of processors may be a general-purpose processor such as a central processing unit (CPU), an application processor (AP), a digital signal processor (DSP), or the like, a graphics-only processor such as a graphics processor (GPU), a vision processing unit (VPU), an AI-only processor such as a neural network processor (NPU), or the like, but the processor is not limited thereto. The one or a plurality of processors may control processing of the input data according to a predefined operating rule or AI model stored in the memory. If the one or a plurality of processors is an AI-only processor, the AI-only processor may be designed with a hardware structure specialized for the processing of a particular AI model.

The pre-defined operating rule or artificial intelligence model is made through learning. Here, being made through learning may refer that a basic artificial intelligence model is trained by using a plurality of learning data according to a learning algorithm, so that a predefined operation rule or artificial intelligence model set to perform a desired characteristic (or a purpose) is generated. The learning may be performed by a device itself in which artificial intelligence according to the embodiments of the disclosure is performed, and may be implemented through a separate server and/or system. Examples of training algorithms include, but are not limited to, supervised learning, unsupervised learning, semi-supervised learning, or reinforcement learning.

The AI model may include a plurality of neural network layers. Each of the plurality of neural network layers includes a plurality of weight values, and may perform a neural network processing operation through an iterative operation leveraging results of a previous layer and a plurality of weight values. The plurality of weight values included in the plurality of neural network layers may be optimized by training results of the AI model. For example, the plurality of weight values may be updated such that loss values or cost values obtained in the AI model during the training process are reduced or minimized. The artificial neural network may include a deep neural network (DNN) and may include, for example, but is not limited to, a convolutional neural network (CNN), a recurrent neural network (RNN), a restricted Boltzmann machine (RBM), a deep belief network (DBN), bidirectional recurrent deep neural network (BRDNN), a deep Q-network, or the like. A learning algorithm is a method for training a predetermined target device (e.g., a robot) by using a plurality of learning data so as to make a determination or prediction of a predetermined target device by itself. Examples of learning algorithms include supervised learning, unsupervised learning, semi-supervised learning, or reinforcement learning, and the learning algorithm in the disclosure is not limited to the examples described above except when specified.

The storage medium readable by a machine may be provided in the form of a non-transitory storage medium that is a tangible device and may not include a signal (e.g., electromagnetic wave). This term does not distinguish that data is permanently or temporarily stored in the storage medium. For example, "non-transitory storage medium" may include a buffer in which data is temporarily stored.

According to embodiments, a method disclosed herein may be provided in software of a computer program product. A computer program product may be traded between a seller and a purchaser as a commodity. A computer program product may be distributed in the form of a machine readable storage medium (e.g., compact disc read only memory (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

Each of the components (for example, a module or a program) according to one or more embodiments may be composed of one or a plurality of objects, and some subcomponents of the components described above may be omitted, or other subcomponents may be further included in the embodiments. Alternatively or additionally, some components (e.g., modules or programs) may be integrated into one entity to perform the same or similar functions performed by each respective component prior to integration.

Operations performed by a module, program, or other component, in accordance with the embodiments, may be performed sequentially, in a parallel, repetitive, or heuristic manner, or at least some operations may be performed in a different order, omitted, or other operations can be added.

The term "unit" or "module" used in the disclosure includes units including hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

The embodiments of the disclosure may be implemented as software that includes instructions stored in machine-readable storage media readable by a machine (e.g., a computer). A device may call instructions from a storage medium and that is operable in accordance with the called instructions, including an electronic apparatus (e.g., the electronic device).

When the instruction is executed by a processor, the processor may perform the function corresponding to the instruction, either directly or under the control of the processor, using other components. The instructions may include a code generated or executed by the compiler or interpreter.

While the disclosure has been shown and described with reference to various embodiments thereof, it will be understood by those skilled in the art that various changes in form and details may be made therein without departing from the spirit and scope of the disclosure as defined at least by the appended claims and their equivalents.

What is claimed is:

1. An electronic device comprising:
at least one memory configured to store at least one instruction; and
at least one processor configured to execute the at least one instruction to:
obtain an original image and a corrected image, wherein the corrected image is obtained from the original image based on settings of a user;
provide the original image and the corrected image to a neural network model;
obtain, by using the neural network model, information for at least one correction parameter by identifying the at least one correction parameter to be applied to the original image to generate the corrected image;
receive a user command to correct a first image; and
obtain a second image in which the first image is corrected based on the information for the at least one correction parameter.

2. The electronic device of claim 1, wherein the corrected image is obtained by correcting the original image.

3. The electronic device of claim 1, wherein the information for the at least one correction parameter is obtained by identifying pixel values of the corrected image.

4. The electronic device of claim 1, wherein the at least one processor comprises an AI processor for controlling operations of the neural network model.

5. The electronic device of claim 1, wherein the neural network model comprises an implementor configured to obtain the information for the at least one correction parameter and a comparator configured to compare a plurality of images, and
wherein the at least one processor is further configured to:
obtain the information for the at least one correction parameter by inputting the original image to the implementor;
obtain a fifth image by correcting the original image based on the information for the at least one correction parameter;
obtain second feedback information based on a difference between a pixel value of the corrected image and a pixel value of the fifth image by inputting the corrected image and the fifth image to the comparator; and
train the implementor based on the second feedback information.

6. The electronic device of claim 5, wherein the at least one processor is further configured to:
based on receiving the user command, input the first image to the neural network model; and
obtain the second image by correcting the original image based on the information for the at least one correction parameter.

7. The electronic device of claim 1, further comprising a display,
wherein the at least one processor is further configured to execute the at least one instruction to:
based on obtaining the second image, control the display to display a first user interface (UI) element to select whether to correct the second image based on a user setting with respect to a correction parameter;
based on receiving a third user command for selecting to correct the second image through the first UI element, control the display to display a second UI element to select at least one parameter associated with correction of the second image; and
based on receiving a fourth user command for selecting the at least one parameter associated with correction of the second image through the second UI element, obtain a fifth image by correcting the second image.

8. The electronic device of claim 1, wherein the at least one processor is further configured to execute the at least one instruction to:
obtain first type information associated with a type of the original image; and
train the neural network model based on the original image, the corrected image, and the first type information.

9. The electronic device of claim 8, wherein the at least one processor is further configured to execute the at least one instruction to:
based on obtaining the first image, obtain second type information associated with a type of the first image; and
based on receiving the user command to correct the first image, obtain the second image by correcting the first image using the neural network model based on the first image and the second type information.

10. The electronic device of claim 1, wherein the at least one processor is further configured to execute the at least one instruction to identify the corrected image based on a first user command indicating the corrected image.

11. The electronic device of claim 1, further comprising a display,
wherein the at least one processor is further configured to execute the at least one instruction to:
control the display to display a plurality of images; and
identify the corrected image based on a first user command indicating the corrected image, from among the plurality of images.

12. A method for controlling of an electronic device, the method comprising:
obtaining an original image and a corrected image, wherein the corrected image is obtained from the original image based on settings of a user;
providing the original image and the corrected image to a neural network model;
obtaining, by using the neural network model, information for at least one correction parameter to be applied to the original image to generate the corrected image;
receiving a user command to correct a first image; and
obtaining a second image in which the first image is corrected based on the information for the at least one correction parameter.

13. The method of claim 12, further comprising obtaining the corrected image by correcting the original image.

14. The method of claim 12, further comprising identifying pixel values of the corrected image to obtain the information for the at least one correction parameter.

15. The method of claim 12, further comprising controlling an artificial intelligence (AI) processor to control operations of the neural network model.

16. The method of claim 12, further comprising:
obtaining the information for the at least one correction parameter by inputting the original image to the neural network model;
obtaining a fifth image by correcting the original image based on the information for the at least one correction parameter;
obtaining second feedback information based on a difference between a pixel value of the corrected image and a pixel value of the fifth image; and
training the neural network model based on the second feedback information.

17. The method of claim 16, further comprising:
based on receiving the user command, inputting the first image to the neural network model; and
obtaining the second image by correcting the original image based on the information for the at least one correction parameter.

18. The method of claim 12, further comprising,
based on obtaining the second image, controlling a display to display a first user interface (UI) element to select whether to correct the second image based on a user setting with respect to a correction parameter;
based on receiving a third user command for selecting to correct the second image through the first UI element, controlling the display to display a second UI element to select at least one parameter associated with correction of the second image; and
based on receiving a fourth user command for selecting the at least one parameter associated with correction of the second image through the second UI element, obtaining a fifth image by correcting the second image.

19. The method of claim 12, further comprising:
obtaining first type information associated with a type of the original image;
training the neural network model based on the original image, the corrected image, and the first type information;
based on obtaining the first image, obtaining second type information associated with a type of the first image; and
based on receiving the user command to correct the first image, obtaining the second image by correcting the first image using the neural network model based on the first image and the second type information.

20. A non-transitory computer readable recording medium storing a program which is executable by processor to perform a method for controlling an electronic device, the method comprising:
obtaining an original image and a corrected image, wherein the corrected image is obtained from the original image based on settings of a user;
provide the original image and the corrected image to a neural network model;
obtaining, by using the neural network model, information for at least one correction parameter to be applied to the original image to generate the corrected image;
receiving a user command to correct a first image; and
obtaining a second image in which the first image is corrected based on the information for the at least one correction parameter.

* * * * *